US007020259B2

(12) United States Patent
Hussain et al.

(10) Patent No.: US 7,020,259 B2
(45) Date of Patent: Mar. 28, 2006

(54) PRIVACY SCREENING SERVICE FOR TELECOMMUNICATIONS

(75) Inventors: Aamir Hussain, Parker, CO (US); Robert A. Koch, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 330 days.

(21) Appl. No.: 10/425,250

(22) Filed: Apr. 29, 2003

(65) Prior Publication Data

US 2004/0218743 A1 Nov. 4, 2004

(51) Int. Cl.
*H04M 3/42* (2006.01)
(52) U.S. Cl. .............................. 379/211.02; 379/211.01; 379/207.02; 379/207.15
(58) Field of Classification Search ............ 379/142.05, 379/201.01, 201.11, 201.02, 207.02, 207.15, 379/211.01, 211.02
See application file for complete search history.

(56) References Cited

U.S. PATENT DOCUMENTS 5,327,486 A * 7/1994 Wolff et al. ............... 379/93.23
6,654,452 B1 * 11/2003 Murray et al. ............... 379/197
2004/0213396 A1 * 10/2004 MacNamara et al.

OTHER PUBLICATIONS

Hirschman et al. AT&T BellLabs record titled LASS, May 1985.*
Singer ProQuest Hang-ups irritating to millions Jan. 4, 1998.*

* cited by examiner

*Primary Examiner*—Ahmad F. Matar
*Assistant Examiner*—Quynh H. Nguyen
(74) *Attorney, Agent, or Firm*—Walters & Zimmerman; Jennifer Medin; Todd Mitchem (57) ABSTRACT

Methods and systems are disclosed for providing privacy screening service during telephone calls. One method monitors a telephone call for a call screening request. The telephone call is from a calling telephone number to a called telephone number. An action is taken in response to the call screening request. The action could be playing an announcement, terminating the connection, forwarding to voice mail, storing the calling telephone number in a database, adding the calling telephone number to a Do Not Call list, updating a subscriber's profile with the calling telephone number, and/or storing the calling telephone number in a subscriber's blocked call list. The call screening request may comprise a Dual-Tone Multi-Frequency, a softkey entry, and/or a data message.

30 Claims, 10 Drawing Sheets

PRIVACY SCREENING SERVICE FOR TELECOMMUNICATIONS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to telephony and to computers and, more particularly, to methods and systems for providing privacy screening service during live telephone calls.

2. Description of the Related Art

Companies and governments are trying prevent telemarketing calls. Nearly everyone has experienced an annoying telemarketing call, and every year many people are defrauded by telemarketers. Many products, such as the TELEZAPPER™, attempt to reduce telemarketing calls (TELEZAPPER is a trademark of the Royal Appliance Manufacturing Company, www.royalappliance.com). The United States Federal Trade Commission and many state governments have created "Do Not Call" lists/registries that make it illegal for telemarketers to call a phone number on the list.

Telecommunications service providers also offer services that reduce telemarketing calls. BellSouth Corporation, for example, offers PRIVACY DIRECTOR® service (PRIVACY DIRECTOR® is a registered trademark of BellSouth Intellectual Property Corporation). This service tries to prevent unwanted calls, such as telemarketing calls, from ringing a subscriber's phone. This PRIVACY DIRECTOR® service does not connect a call when the calling telephone number is private. That is, the telecommunications switch recognizes when the calling telephone number is marked private, so Caller ID cannot recognize the calling telephone number. The PRIVACY DIRECTOR® service requires the calling party to i) unblock their telephone number or ii) announce their name. If the calling party unblocks their telephone number, then the calling telephone number is delivered with the call and the subscriber's Caller ID displays the number. If the calling party decides to announce their name, the telephone call is routed to a media server. The media server plays an announcement that asks the calling party to record their name. The recorded name is delivered to the called party. The called party, prior to acceptance of the call, hears the recorded name of the calling party. The called party then has the option to accept the call. This PRIVACY DIRECTOR® service puts the called party in control as the recipient of the calls.

Now, however, telemarketers have learned to bypass the PRIVACY DIRECTOR® service. Telemarketers have begun to use public telephone numbers. That is, telemarketers are getting around the PRIVACY DIRECTOR® service by unblocking their caller ID. The telemarketer's telephone number, then, is public as opposed to private. Because the telemarketer's telephone number is public, the PRIVACY DIRECTOR® service does not prevent a connection to the called party. The Caller ID service displays the calling telephone number, the subscriber answers the call, and the subscriber is then subjected to the telemarketer's unwanted proposal.

There is, accordingly, a need in the art for rejecting telemarketing calls in real time after a connection is made. Consumers must have a quick and convenient way of disposing of telemarketers during a live telephone call. Consumers must be able to reject a telemarketer without prolonging the conversation. There is also a need for rejecting telemarketing calls that appeals to those consumers that, by their nature, tend to be more polite and want to let the telemarketer "down easy."

BRIEF SUMMARY OF THE INVENTION

The aforementioned problems, and other problems, are reduced by a privacy screening service. A telecommunications service provider provides this privacy screening service. This privacy screening service allows a subscriber, in real time during a live telephone call, to send a call screening request during the telephone call. The call screening request may comprise a Dual-Tone Multi-Frequency key (e.g., "Touch Tones") on a telephone keypad, a softkey entry on a communications device, and/or a data message from an Internet Protocol phone or client application. The call screening request is accepted and sent to the intelligence controlling the telecommunications switch. The intelligence controlling the telecommunications switch interprets the call screening request and determines what action is required. As an example, heretofore when a party depressed a touch-tone key during a live telephone call, a tone was generated, yet the telecommunications network did not recognize that tone as requiring an action. This invention, however, implements an action in response to the call screening request. The action could include playing an announcement, terminating the connection, forwarding to voice mail, storing the calling telephone number in a database, adding the calling telephone number to a Do Not Call list, updating a subscriber's profile with the calling telephone number, and/or storing the calling telephone number in a subscriber's blocked call list.

This privacy screening service, for example, could be used to reject telemarketers. When a subscriber receives a telemarketing call, the subscriber may, in real time during the live telephone call, send the call screening request. The subscriber, for example, may enter a Dual-Tone Multi-Frequency tone. The telecommunications network recognizes that Dual-Tone Multi-Frequency tone and plays an announcement to the calling telemarketer. Once the announcement is played, the telecommunications network could also be instructed to automatically terminate the telephone call. This method of rejecting telemarketing calls (i.e., playing the announcement and then terminating the call) would appeal to those subscribers who desire a quick, convenient and, yet, polite method of disposing of telemarketers.

When a subscriber enters the call screening request, other actions could also be taken. The telecommunications network, for example, could forward the telephone call to voicemail. The subscriber, at any time during the telephone call, could forward the other party to voicemail and then retrieve the voicemail message at a later and more convenient time. The call screening request could also cause the calling telephone number to be stored, added, and/or communicated to a Do Not Call list/database, a blocked call list, or any other database. Because the subscriber need only enter the call screening request to add the calling telephone number to the Do Not Call list/database, this invention provides a very quick and convenient method of preventing telemarketing calls. The subscriber may even maintain various Do Not Call lists, such as a list for a wireless communications device, a list for a wireline communications device (e.g., a POTS phone), a list for a spouse, a list for a child, and other such Do Not Call lists. The subscriber could also have a combined Do Not Call list in which multiple lines and/or devices access a single list. This invention could also communicate the calling telephone number to a state Do Not Call database or a federal Do Not Call database. When the subscriber enters the call screening request, the telecommunications network could automatically add the calling telephone number to various databases, thus further reducing unwanted calls.

This privacy screening service also helps the subscriber prove violations of Do Not Call lists. Some state and federal laws prohibit telemarketing calls to telephone numbers on these Do Not Call lists. When a telemarketer calls, and the subscriber sends the call screening request to add the calling telephone number to a Do Not Call list, the telecommunications network could "tag" the telemarketing call with a date and time. When future telemarketing telephone calls are received, this privacy screening service could automatically determine if the telemarketer previously called in violation of the Do Not Call list. The privacy screening service could alert the subscriber and provide dates and times of the violating telemarketing calls. The subscriber would then have evidence to pursue legal action against the telemarketer.

The aspects of this invention, however, are applicable to non-telemarketing calls and situations. The voicemail feature, for example, would also appeal to anyone requiring voicemail during a live telephone call. When, for example, a more important situation arises during the telephone call, the subscriber may forward the other party to voicemail, tend to the important situation, and later retrieve the voicemail message.

This invention discloses methods and systems for providing privacy screening service during telephone calls. One method monitors a telephone call for a call screening request. The telephone call is from a calling telephone number to a called telephone number. An action is taken in response to the call screening request. The action could include playing an announcement, terminating the connection, forwarding to voice mail, storing the calling telephone number in a database, adding the calling telephone number to a Do Not Call list, updating a subscriber's profile with the calling telephone number, and/or storing the calling telephone number in a subscriber's blocked call list. The call screening request could comprise a Dual-Tone Multi Frequency tone, a softkey entry, and/or a data message.

Another embodiment of this invention describes another method for providing this privacy screening service. This method processes a telephone call from a calling telephone number to a called telephone number. After a connection between the calling telephone number and the called telephone number, the telephone call is monitored for a call screening request. Upon entry of the call screening request, an action is taken in response to the call screening request. The action could include playing an announcement, terminating the connection, forwarding to voice mail, storing the calling telephone number in a database, adding the calling telephone number to a Do Not Call list, updating a subscriber's profile with the calling telephone number, and/or storing the calling telephone number in a subscriber's blocked call list.

Still another embodiment of this invention describes yet another method for providing this privacy screening service. A telephone call is received at a telecommunications switch, and the telephone call is from a calling telephone number to a called telephone number. The telephone call is connected to the called telephone number. A call screening request is received from the called telephone number, and an action is taken in response to the call screening request. The action could include playing an announcement, terminating the connection, forwarding to voice mail, storing the calling telephone number in a database, adding the calling telephone number to a Do Not Call list, updating a subscriber's profile with the calling telephone number, and/or storing the calling telephone number in a subscriber's blocked call list.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The present invention provides methods, systems, computer programs, and computer program products that provide a privacy screening service during telephone calls. This privacy screening service allows a subscriber, in real time during a live telephone call, to utilize Dual-Tone Multi-Frequency keys (e.g., "Touch Tones"), softkeys, and/or data messages to dispose of the call. A call screening request is accepted and sent to the intelligence controlling the telecommunications switch for interpretation and for an action. As an example, heretofore when a party depressed a touchtone key during a live telephone call, a tone was generated, yet the telecommunications network did not recognize that tone as requiring an action. This invention, however, implements an action in response to the call screening request. The action could include playing an announcement, terminating the connection, forwarding to voice mail, storing the calling telephone number in a database, adding the calling telephone number to a Do Not Call list, updating a subscriber's profile with the calling telephone number, and/or storing the calling telephone number in a subscriber's blocked call list.

Figure 1:
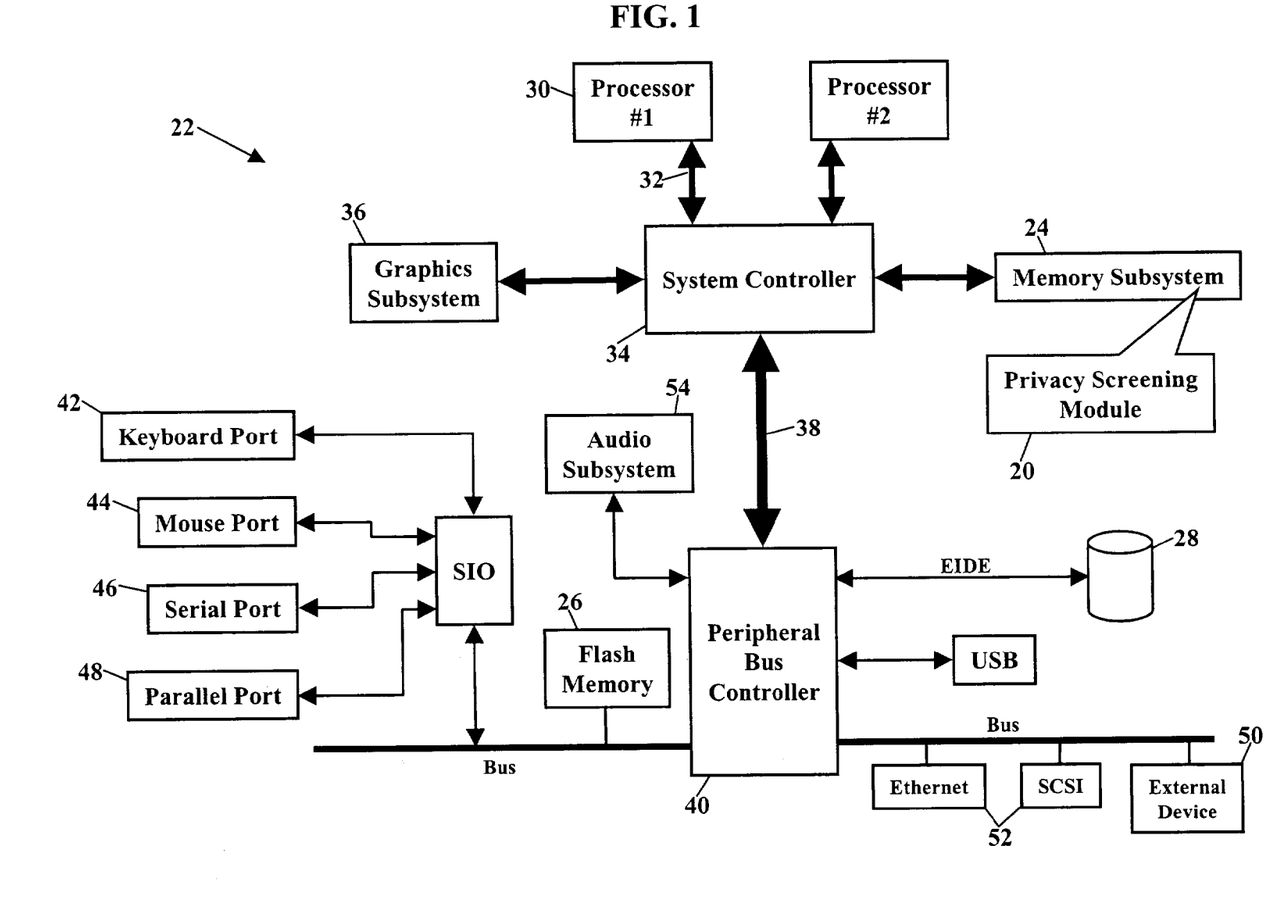
FIG. 1 is a block diagram showing a Privacy Screening Module residing in a computer system.
Figure 2:
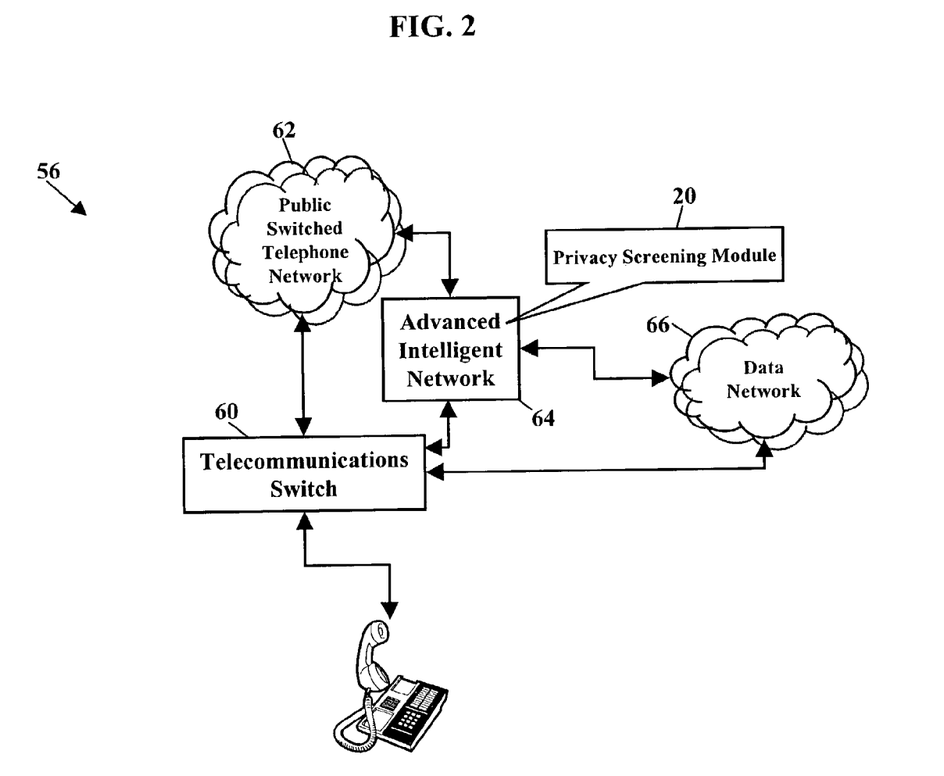
FIG. 2 is a schematic showing the Privacy Screening Module operating within an intelligently-controlled telecommunications network.
Figure 3:
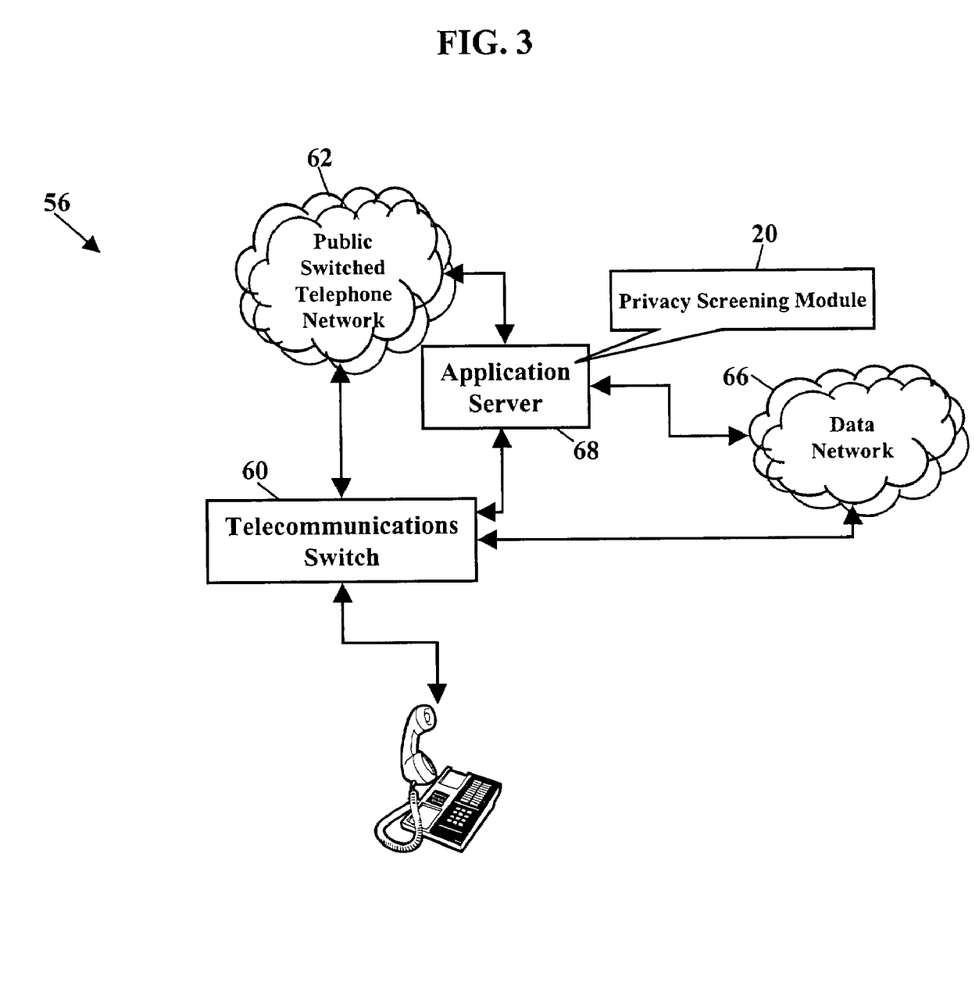
FIG. 3 is a schematic showing the Privacy Screening Module operating within a packet network architecture.

FIGS. 1–3 depict possible operating environments for an embodiment of this invention. This embodiment of a Privacy Screening Module 20 includes computer programs, computer systems, and telecommunications systems that allow a subscriber, in real time during a live telephone call, to take actions during the call. The Privacy Screening Module 20, for example, allows the subscriber to hit a Dual-Tone Multi-Frequency key, a softkey, and/or a data message to play an announcement to the other party. This announcement may be a recording that rejects the caller, and the Privacy Screening Module 20 could then automatically terminate the telephone call. Because the announcement may be personalized, the wording and tone of the announcement can be tailored to the subscriber's personality (e.g., a "soft" rejection or a "hard" rejection). The call screening request could alternatively forward the call to voice mail, thus still allowing the calling party to leave a message. The Privacy Screening Module 20, however, also offers the subscriber the ability to add the calling telephone number in a Do Not Call list and add the calling telephone number to the subscriber's blocked call list.

FIG. 1 is a block diagram showing the Privacy Screening Module 20 residing in a computer system 22. The Privacy Screening Module 20 operates within a system memory device. The Privacy Screening Module 20, for example, is shown residing in a memory subsystem 24. The Privacy Screening Module 20, however, could also reside in flash memory 26 or peripheral storage device 28. The computer system 22 also has one or more central processors 30 executing an operating system. The operating system, as is well known, has a set of instructions that control the internal functions of the computer system 22. A system bus 32 communicates signals, such as data signals, control signals, and address signals, between the central processor 30 and a system controller 34 (typically called a "Northbridge"). The system controller 34 provides a bridging function between the one or more central processors 30, a graphics subsystem 36, the memory subsystem 24, and a PCI (Peripheral Controller Interface) bus 38. The PCI bus 38 is controlled by a Peripheral Bus Controller 40. The Peripheral Bus Controller 40 (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller 40 could also include an audio subsystem 54. Those of ordinary skill in the art understand that the program, processes, methods, and systems described in this patent are not limited to any particular computer system or computer hardware.

The central processor 30 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is WINDOWS® (WINDOWS® is a registered trademark of Microsoft Corporation, One Microsoft Way, Redmond Wash. 98052-6399, 425.882.8080, www.Microsoft.com). Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical User Interface (GUI). The Graphical User Interface typically includes a combination of signals communicated along the keyboard port 42 and the mouse port 44. The Graphical User Interface provides a convenient visual and/or audible interface with a user of the computer system 22.

FIG. 2 is a schematic showing the Privacy Screening Module 20 operating within an intelligently-controlled telecommunications network 56. This telecommunications network 56 further represents an operating environment for the Privacy Screening Module 20. The telecommunications network 56 includes a telecommunications switch 60 of a Public Switched Telephone Network 62. The telecommunications switch 60 includes Advanced Intelligent Network (AIN) componentry 64 controlling many features of the telecommunications switch 60. The Advanced Intelligent Network (AIN) componentry 64 would include the Privacy Screening Module 20 operating within the computer system (shown as reference numeral 22 in FIG. 1). The telecommunications switch 60 and the Advanced Intelligent Network (AIN) componentry 64 may also interface with a data network 66. The signaling between the telecommunications switch 60, the Public Switched Telephone Network 62, the Advanced Intelligent Network 64, and the data network 66, however, is well understood in the art and will not be further described. If a reader desires a more detailed explanation, the reader is directed to U.S. Pat. No. 5,430,719 issued to Weisser (Jul. 4, 1995), with the "Summary of the Invention" and the "Detailed Description of the Preferred Embodiment" sections incorporated herein by reference. The reader is also directed to U.S. Pat. No. 5,917,817 issued to Dunn et al. (Jun. 29, 1999), with the "Summary of the Invention" and the "Detailed Description" sections incorporated herein by reference.

FIG. 3 is similar to FIG. 2, yet FIG. 3 illustrates a packet network architecture. This packet network represents an alternative operating environment for the Privacy Screening Module 20. Here the telecommunications switch 60 includes a packet-based "softswitch." This softswitch uses software control to provide voice, data, and video services by dynamically changing its connection data rates and protocols types. An application server 68 interfaces with the softswitch via a packet protocol, such as Session Initiation Protocol (SIP). This application server 68 includes voice service protocols, triggers, and operations that allow the Public Switched Telephone Network 62 and the data network 66 to interoperate.

Figure 4:
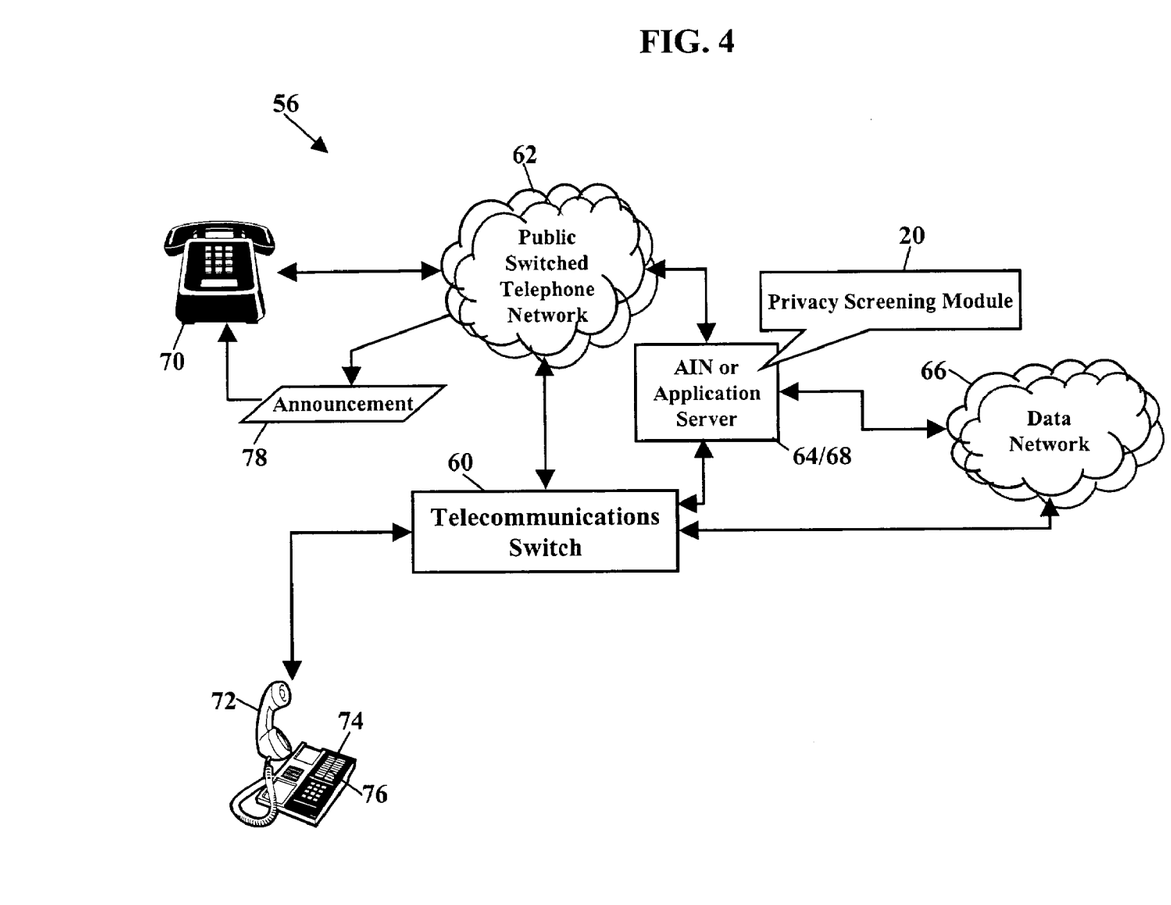
FIG. 4 is a schematic illustrating an embodiment of this invention for providing privacy screening service during telephone calls.

FIG. 4 is a schematic illustrating an embodiment of this invention for providing privacy screening service during telephone calls. Here the Privacy Screening Module 20 allows a subscriber, in real time during a live telephone call, to take actions during the call. If either party to the telephone call is a subscriber to this privacy screening service, the Privacy Screening Module 20 allows the subscriber to utilize a call screening request during the telephone call. The call screening request may comprise a Dual-Tone Multi-Frequency tone on a telephone keypad, a softkey on a similar keypad, and/or a data message (e.g., an SIP message). As FIG. 4 shows, a telephone call is placed from a calling telephone number 70 (hence the calling party) to a called telephone number 72 (the called party). The telephone call is processed from the calling party (the calling telephone number 70), into the Public Switched Telephone Network 62, and to the destination telecommunications switch 60 serving the called party (the called telephone number 72). The intelligence controlling the destination telecommunications switch 60 detects a trigger that identifies either party as a subscriber to this privacy screening service. The destination telecommunications switch 60 is then instructed to establish a connection between the calling telephone number and the called telephone number, thus allowing the parties to converse.

Once the connection is established, the live telephone call is monitored for the call screening request. The live telephone call is monitored for the next event, and that event is entry of the call screening request. The terms "monitor," "monitoring," and "monitored" mean the telecommunications network 56 listens for, and/or is able to detect, a Dual-Tone Multi-Frequency tone signal, entry of a softkey, or receipt of a data message. The telecommunications switch 60, for example, may listen for the Dual-Tone Multi-Frequency tone, or the telecommunications switch 60 may be instructed to listen for the Dual-Tone Multi-Frequency tone. The terms "monitor," "monitoring," and "monitored" may also mean the Advanced Intelligent Network componentry 64, or the application server 68, listens for the Dual-Tone Multi-Frequency tone. The Advanced Intelligent Network componentry 64, or the application server 68, could instruct or command some portion of the telecommunications network 56 to listen for the Dual-Tone Multi-Frequency tone. As those of ordinary skill in the art understand, Dual-Tone Multi-Frequency signaling is a means of transferring information from a party to the telecommunications network 56 through the use of in-band audio tones. Each digit of information is assigned a simultaneous combination of one of a lower group of frequencies and one of a higher group of frequencies to represent each digit or character. The telecommunications network 56 monitors the telephone call for the next event to happen—in this case, the next event is entry of a Dual-Tone Multi-Frequency tone. That Dual-Tone Multi-Frequency tone is accepted and sent to the intelligence controlling the telecommunications switch 60 (such as the Advanced Intelligent Network componentry 64 or the application server 68) for interpretation and for an action.

Upon entry of a Dual-Tone Multi-Frequency tone, the telecommunications network 56 takes an action. This invention allows the subscriber to utilize the touch-tone keys 74 on the telephone keypad 76 during the telephone call. Heretofore when a party depressed a touch-tone key 74 during a live telephone call, a tone was generated, yet the telecommunications network 56 did not recognize that tone as requiring an action. This invention, however, implements an action in response to the Dual-Tone Multi-Frequency tone. This invention, for example, launches a next event list and arms the T_DTMF_ENTERED event in the authorize termination message. This event could make the telecommunications switch 60 listen in on the telephone call and wait for a DTMF event. When the subscriber presses any key 74 on the keypad 76, and hangs up, the Privacy Screening Module 20 launches an event back to the Advanced Intelligent Network 64 (e.g., a Service Control Point). The Advanced Intelligent Network 64 checks the digit that was entered by the subscriber and takes the appropriate action. The action could include playing an announcement, terminating the connection, forwarding to voice mail, storing the calling telephone number in a database, adding the calling telephone number to a Do Not Call list, updating a subscriber's profile with the calling telephone number, and/or storing the calling telephone number in a subscriber's blocked call list.

A call screening request, for example, could be used to reject telemarketers. When a subscriber receives a telemarketing call, the subscriber may, in real time during the live telephone call, enter the call screening request. The subscriber, for example, could hit a Dual-Tone Multi-Frequency key 74 on the keypad 76, hit a softkey on the keypad, or send a data message from a computer device. The telecommunications network 56 recognizes that call screening request tone as requiring an action. Here, for example, that action might be playing an announcement 78 to the calling party. This announcement 78 might be a network-based "telemarketing slam" that rejects the telemarketer. Once the announcement 78 is played, the telecommunications network 56 could also be instructed to terminate the connection between the calling telephone number and the called telephone number. This method of rejecting telemarketing calls (i.e., playing the announcement 78 and then terminating the call) would appeal to those subscribers who desire a quick, convenient and, yet, polite method of disposing of telemarketers.

Another action might be voicemail. When a subscriber receives a telephone call, the subscriber may, in real time during the live telephone call, enter the call screening request. The subscriber, for example, could hit the Dual-Tone Multi-Frequency key 74 on the keypad 76, hit a softkey on the keypad, or send a data message from a computer device. The telecommunications network 56 recognizes that call screening request as requiring an action. Here the action is forwarding the telephone call to voicemail. At any time during the telephone call the subscriber could forward the other party to voicemail. The other party would hear the subscriber's voicemail announcement. The other party to the telephone call could then record a voicemail message, and the subscriber could retrieve this voicemail message at a later time. If, for example, a subscriber is intrigued by a telemarketing proposal, yet does not want to talk with the telemarketer, the subscriber could enter a Dual-Tone Multi-Frequency tone and forward the telemarketer to voicemail. The subscriber could then retrieve the voicemail message at later and more convenient time.

This voicemail feature, however, is not only for telemarketing. This voicemail feature would also appeal to anyone requiring voicemail during a live telephone call. When, for example, a more important situation arises during the telephone call, the subscriber may forward the other party to voicemail, tend to the important situation, and later retrieve the voicemail message.

The announcement 78 could be personalized. The subscriber could access the intelligence controlling the telecommunications switch 60 and record a personalized announcement 78. The subscriber, for example, could access a media server using a toll-free administrative telephone number. The media server could utilize Caller ID to recognize the subscriber's home telephone number, or the media server could prompt for a subscribing telephone number. The media server steps the subscriber through a series of prompts and allows the subscriber to record the personalized announcement 78. The personalized announcement 78 could be any greeting, message, or telemarketing rejection. The personalized announcement 78 could be stored as a specific file in the media server. When the subscriber then enters a DTMF during a live telephone call, the telecommunications switch 60 could then play the personalized announcement 78. The telecommunications switch 60, instead, could be instructed to forward the telephone call to the media server for the personalized announcement 78. The subscriber might have a number of different personalized announcements, and the particular announcement depends upon which DTMF is entered. If the subscriber, for example, enters a "4" on the keypad 76, the telecommunications switch 60 sends the telephone call to the intelligence (e.g., the AIN 64 or the application server 68). The intelligence recognizes that Dual-Tone Multi-Frequency tone as requiring an action, and this action is playing the particular personalized announcement 78 corresponding to the DTMF. The intelligence returns instructions to the telecommunications switch 60 to forward that telephone call to the media server. The media server accesses the particular personalized announcement corresponding to the called telephone number and the DTMF. The media server then plays the particular personalized announcement 78.

Figure 5:
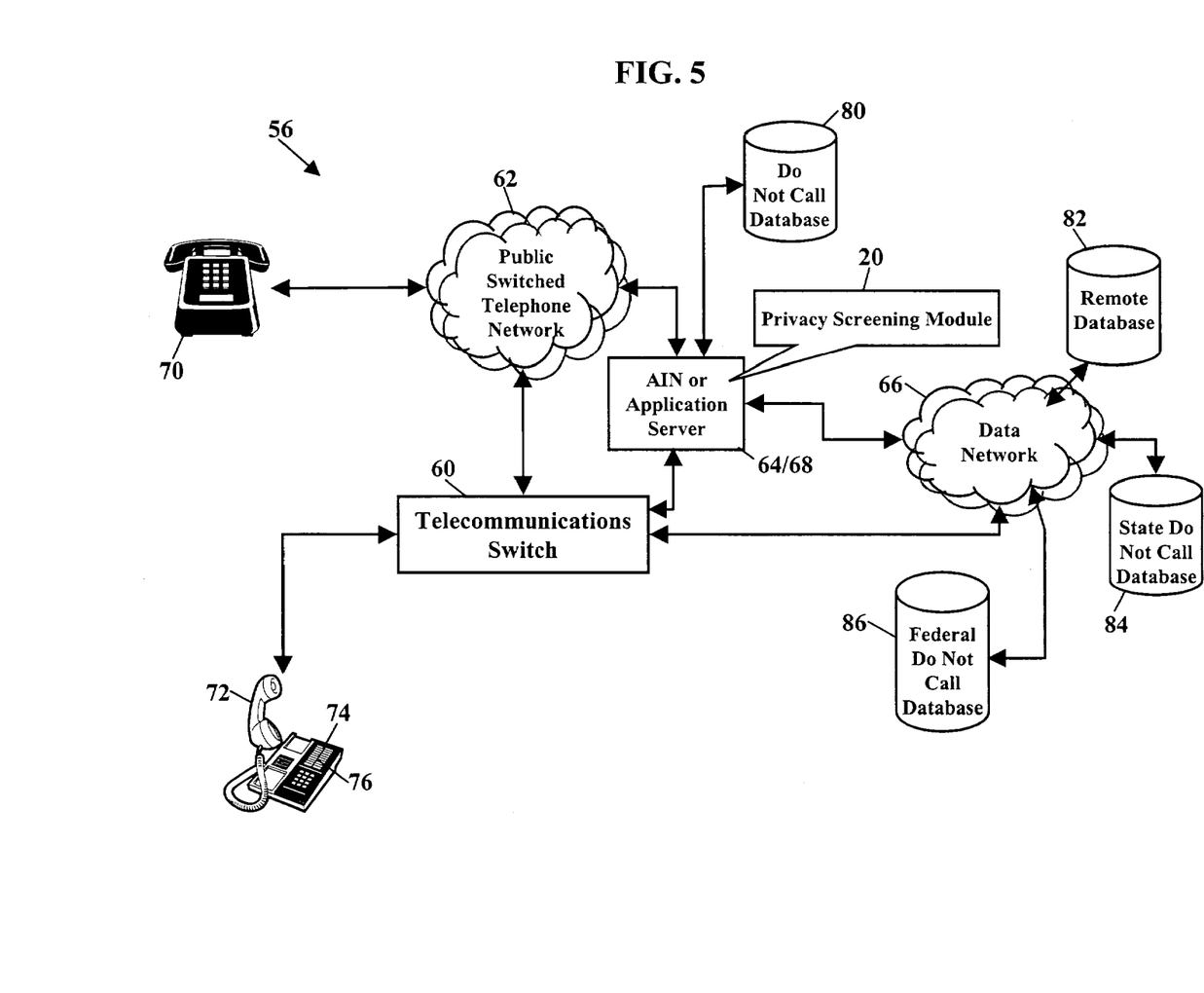
FIG. 5 is a schematic illustrating another embodiment of this invention that stores the calling telephone number in a database.

FIG. 5 is a schematic illustrating another embodiment of this invention for providing privacy screening service during telephone calls. Here the action taken is storing the calling telephone number in a database. When the subscriber enters the call screening request, for example, the telecommunications network 56 could add the calling telephone number to a Do Not Call list/database 80. This Do Not Call list/database 80 could contain the telephone numbers of subscribers/consumers/customers that do not wish to receive telemarketing calls. Because the subscriber need only enter the call screening request to add their telephone number to the Do Not Call list/database 80, this invention provides a very quick and convenient method of preventing telemarketing calls. The call screening request could also update other Do Not Call lists, such as wireless versions, wireline versions, spouse's version, kid's version, and/or a combined version. When the call screening request is entered, this invention could additionally or alternatively communicate the calling telephone number to a remote database 82 via the data network 66. The remote database 82, for example, could be a government Do Not Call list. The calling telephone number, for example, could be communicated to a state Do Not Call database 84 or a federal Do Not Call database 86 via the data network 66. The state Do Not Call database 84 could be provided by a state governmental agency (e.g., the state attorney general). The federal Do Not Call database 86 could be provided by a federal agency (e.g., the Federal Trade Commission). When the subscriber enters the call screening request, the telecommunications network 56 could automatically add the calling telephone number to various databases, thus further reducing unwanted telemarketing calls.

This privacy screening service also helps the subscriber prove violations of Do Not Call lists. Some state and federal laws prohibit telemarketing calls to telephone numbers on these Do Not Call lists. Because the telecommunications network 56 maintains a date and a time of any telephone call, the telecommunications network 56 could "tag" each telemarketing call. When the subscriber enters the call screening request, and the telecommunications network 56 adds/communicates the calling telephone number to a Do Not Call list/database 80, the communication could also include the date and time of the telemarketer's telephone call. When future telephone calls are received, the telecommunications network 56 could query the Do Not Call list/database for the calling telephone number. If a match is found, the privacy screening service could alert the subscriber and provide dates and times of the matching telephone numbers. The subscriber would then have evidence to pursue legal action against the telemarketer.

Figure 6:
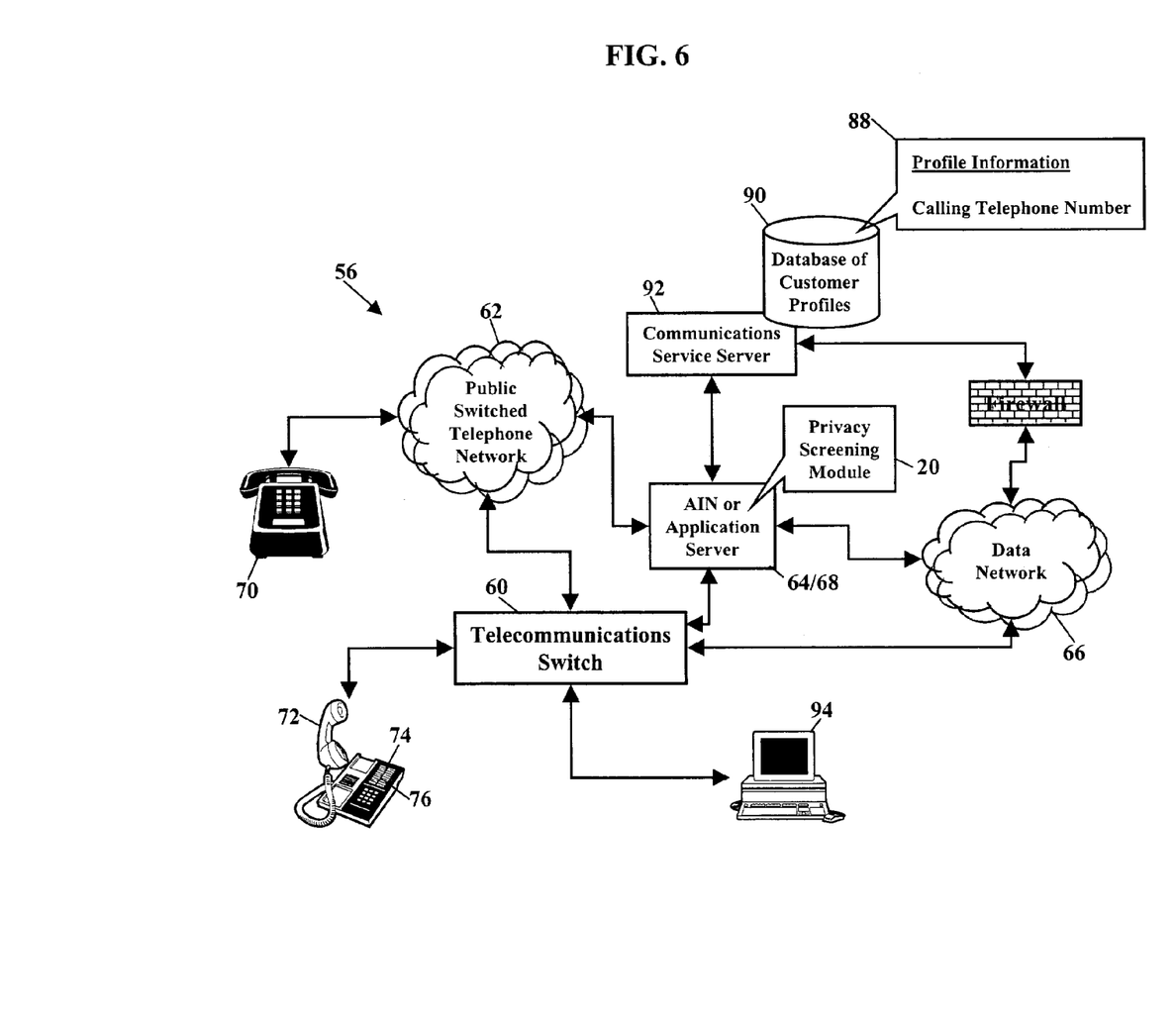
FIG. 6 is a schematic illustrating still another embodiment of this invention updates a subscriber's profile information with the calling telephone number.

FIG. 6 is a schematic illustrating still another embodiment of this invention for providing privacy screening service during telephone calls. When the subscriber sends the call screening request during a live telephone call, the telecommunications network 56 recognizes that call screening request (such as a Dual-Tone Multi-Frequency tone) as requiring an action. Here the action comprises updating a subscriber's profile information 88 with the calling telephone number. The subscriber's profile information 88 is stored in a database 90 of customer profiles. The database 90 of customer profiles is maintained on the Advanced Intelligent Network 64 or the application server 68 or, as FIG. 6 shows, a communications service server 92 communicates with the Advanced Intelligent Network 64 or the application server 68. The database 90 of customer profiles could also be maintained on a computer/server operating on the data network 66.

The profile information 88 is updated with the calling telephone number. That is, when the subscriber enters the call screening request during a live telephone call, the action taken comprises storing the calling telephone number in a subscriber's blocked call list. The subscriber's blocked call list contains calling telephone numbers that the subscriber wishes to block. When the telecommunications switch 60 receives a subsequent telephone call, the intelligence controlling the switch 60 (the Advanced Intelligent Network 64 or the application server 68) suspends processing of the telephone call. A query is sent to determine if the calling telephone number is found in the customer's profile information 88 and, hence, blocked from receipt. If the calling telephone number is blocked, the caller is offered no additional opportunity to bypass the block. The calling telephone number could also be added to related profiles, such as a spouse's profile, a child's profile, a wireless profile, and a wireline profile.

As those of ordinary skill understand, the subscriber's profile information 88 relates to the subscriber's communications services. The specific information related to the provision, presence, and/or availability of these communication services is termed the "profile information" 88. This profile information 88 may include information related to the subscriber's calendar (e.g., appointments and activities), travel itinerary information, presence and availability information, and the subscriber's patterns of behavior. If the reader wishes to learn more about the profile information 88, and how the subscriber may view, add, delete, and otherwise define the subscriber's communications services and the profile information 88, the reader is referred to the commonly-assigned U.S. application Ser. No. 10/012,746, filed Dec. 7, 2001, and which the "Summary" and "Detailed Description" sections are incorporated herein by reference. The reader is also directed to the commonly assigned U.S. application Ser. No. 10/107,616, filed Mar. 27, 2002, and which the "Brief Summary of the Invention" and "Detailed Description of the Invention" sections are incorporated herein by reference.

The profile information 88 may also be accessed by the subscriber. The subscriber may use a computer system 94 to access the communications service server 92 via a connection to the telecommunications switch 60 and a connection to the data network 66. The computer system 94 allows the subscriber to access the subscriber's profile information 88 and view/edit/delete information. Although the call screening request causes an automatic update of the blocked call list, the subscriber could also access the profile information 88 and add telephone numbers to the list of blocked telephone numbers.

Figure 7:
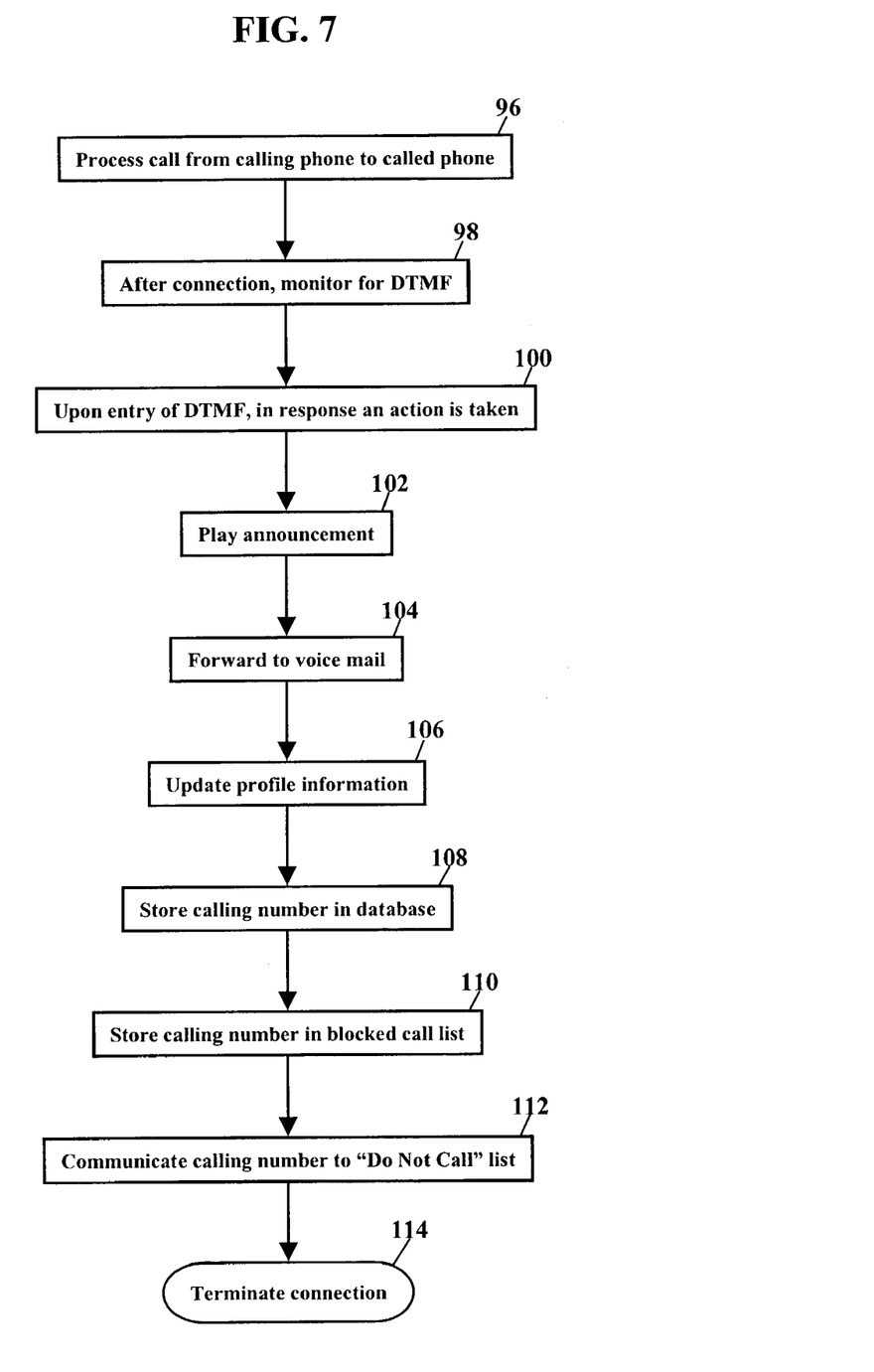
FIG. 7 is a flowchart showing a method of providing privacy screening service.

FIG. 7 is a flowchart showing a method of providing privacy screening service. A telephone call is processed from a calling telephone number to a called telephone number (Block 96). The term "processing," as used herein, encompasses every event from the time the calling telephone number (shown as reference numeral 70 in FIGS. 4–6) goes off-hook to the termination of the telephone call. "Processing" of the telephone call includes routing a voice path and signaling setup and intelligence (e.g., Local Number Portability queries, queries to retrieve Calling Name/Number information, intelligence queries by the AIN 64 or the applications server 68, and standard signaling messages to determine call routing paths). The term "processing" also includes monitoring an established telephone call for possible Dual-Tone Multi-Frequency tone entry, switch hook flash, other events that indicate a party on the telephone call has requested an action, and delivery of call-waiting tones and data. "Processing," however, also encompasses billing activities and measurements at the telecommunications switch 60 or other telecommunications network 56 element.

After a connection between the calling telephone number and the called telephone number, the telephone call is monitored for an event (Block 98). Here, that event is entry of a call screening request, such as a Dual-Tone Multi-Frequency tone. Upon entry of the Dual-Tone Multi-Frequency tone, an action is taken in response to the Dual-Tone Multi-Frequency tone (Block 100). The action might comprise playing an announcement (Block 102), forwarding the telephone call to voice mail (Block 104), and updating a subscriber's profile with the calling telephone number (Block 106). The action might also comprise storing the calling telephone number in a database (Block 108), storing the calling telephone number in the subscriber's blocked call list (Block 110), and/or communicating the calling telephone number to a Do Not Call list (Block 112). The Do Not Call list could be maintained by a telecommunications service provider, a third party, a state government entity, and/or a federal government entity. The action could also comprise terminating the connection (Block 114).

Figure 8:
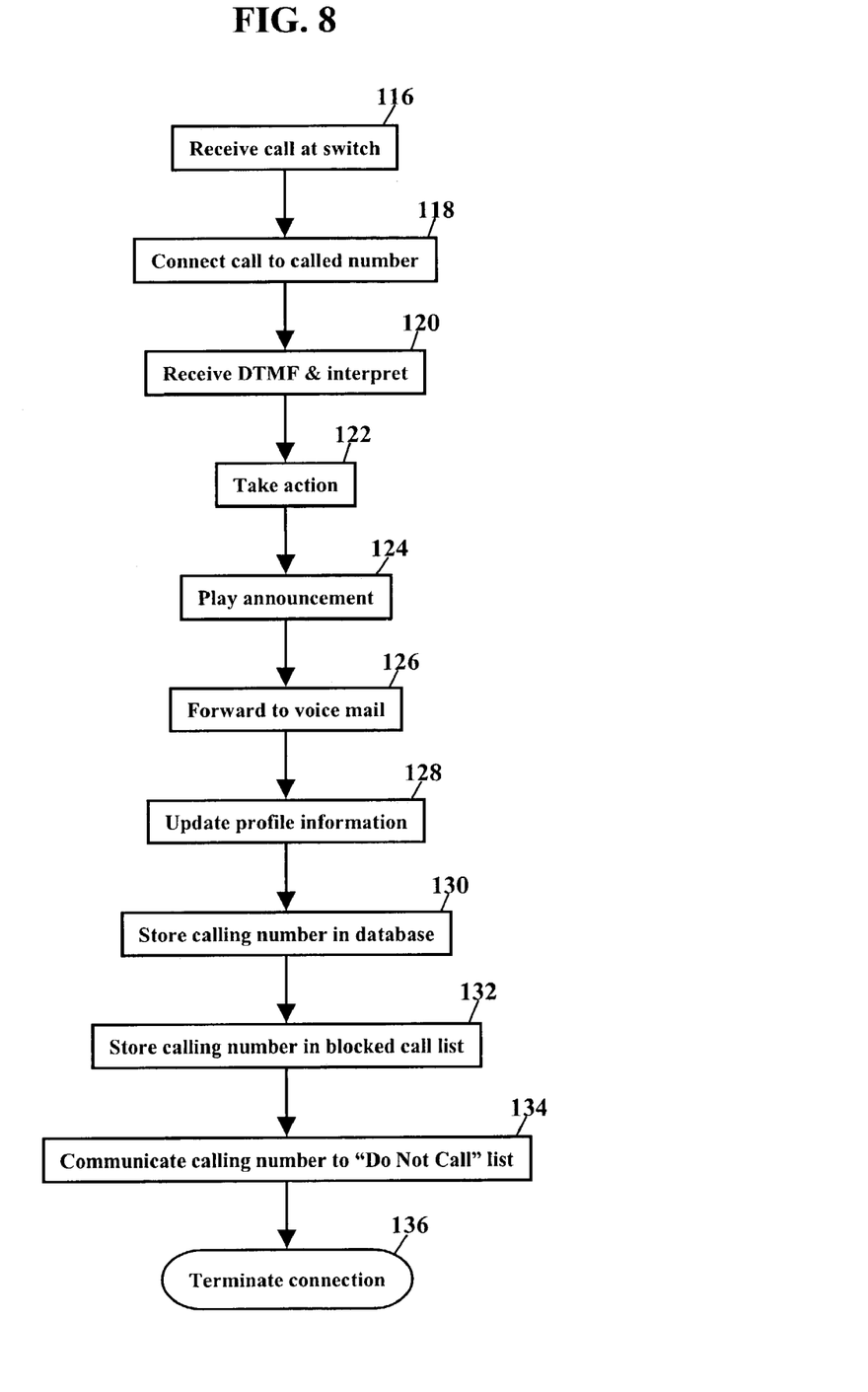
FIG. 8 is a flowchart showing another method of providing privacy screening service.

FIG. 8 is a flowchart showing another method of providing privacy screening service. A telephone call is received at a telecommunications switch (Block 116). The telephone call is from a calling telephone number to a called telephone number. The telephone call is connected to the called telephone number (Block 118). A call screening request, such as a Dual-Tone Multi-Frequency tone, is received from the called telephone number (Block 120), and an action is taken in response to the call screening request (Block 122). The action might comprise playing an announcement (Block 124), forwarding the telephone call to voice mail (Block 126), and updating a subscriber's profile with the calling telephone number (Block 128). The action could also comprise storing the calling telephone number in a database (Block 130), storing the calling telephone number in a subscriber's blocked call list (Block 132), and communicating the calling telephone number to a Do Not Call list (Block 134). The action also comprises terminating the connection (Block 136).

Figure 9:
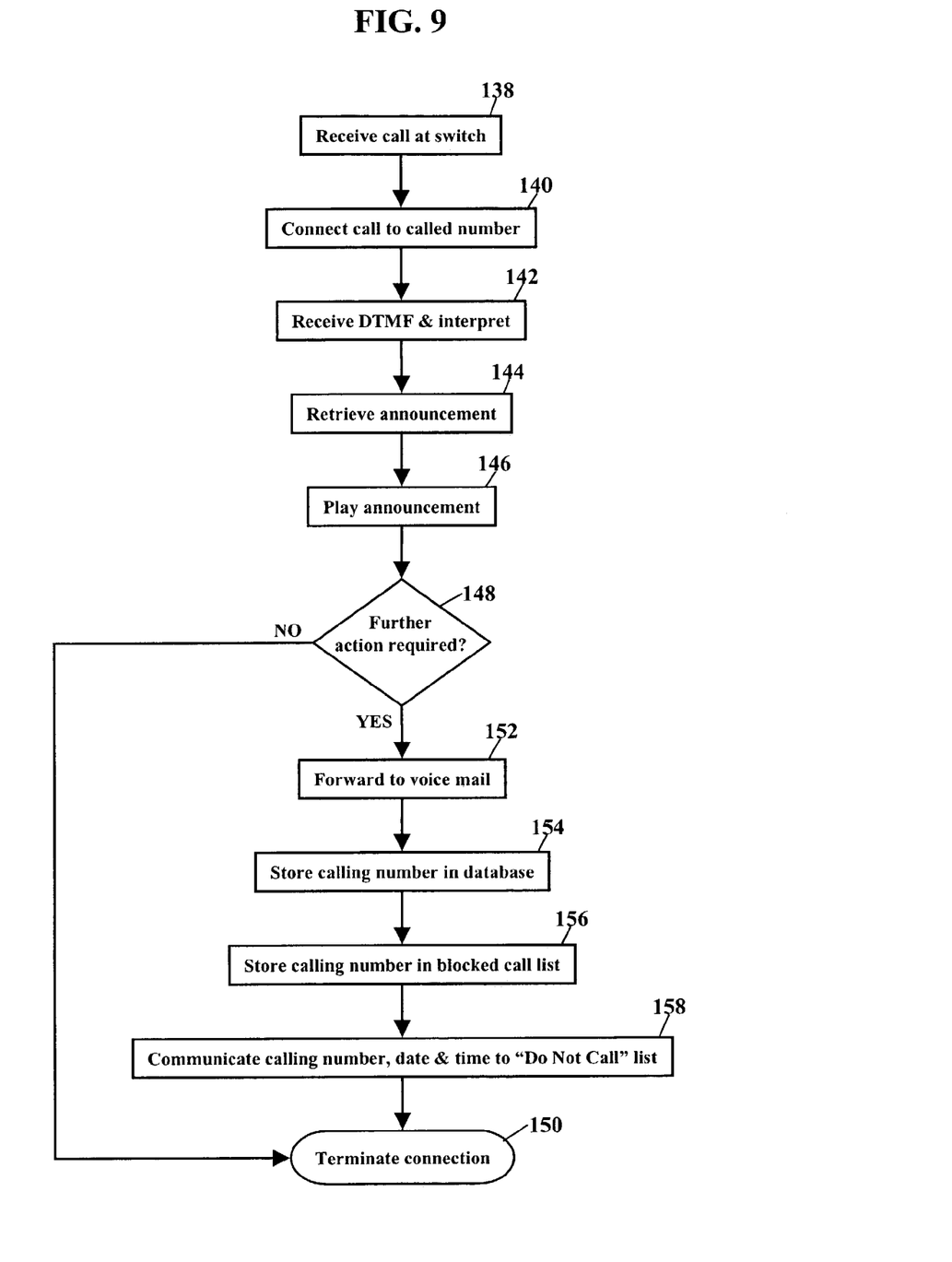
FIG. 9 is a flowchart showing still another method of providing privacy screening service.

FIG. 9 is a flowchart showing still another method of providing privacy screening service. A telephone call is received at a telecommunications switch (Block 138). The telephone call is from a calling telephone number to a called telephone number. The telephone call is connected to the called telephone number (Block 140). A Dual-Tone Multi-Frequency tone is received from the called telephone number (Block 142), and an announcement is retrieved from memory (Block 144). The announcement may correspond to the Dual-Tone Multi-Frequency tone(s) received from the called telephone number, and the announcement may be a network-based announcement and/or a personalized prerecorded announcement. The announcement is played to the calling telephone number (Block 146). If no further action is required (Block 148), the connection is terminated (Block 150) after playing the announcement. If further action is required (Block 148), the telephone call may be forwarded to voice mail (Block 152), the calling telephone number may be stored in a database (Block 154), and the calling telephone number may be added to a list of blocked telephone numbers (Block 156). The called telephone number, the date of the call, and the time of the call may be communicated to a Do Not Call list (Block 158). The connection is then terminated (Block 150).

Figure 10:
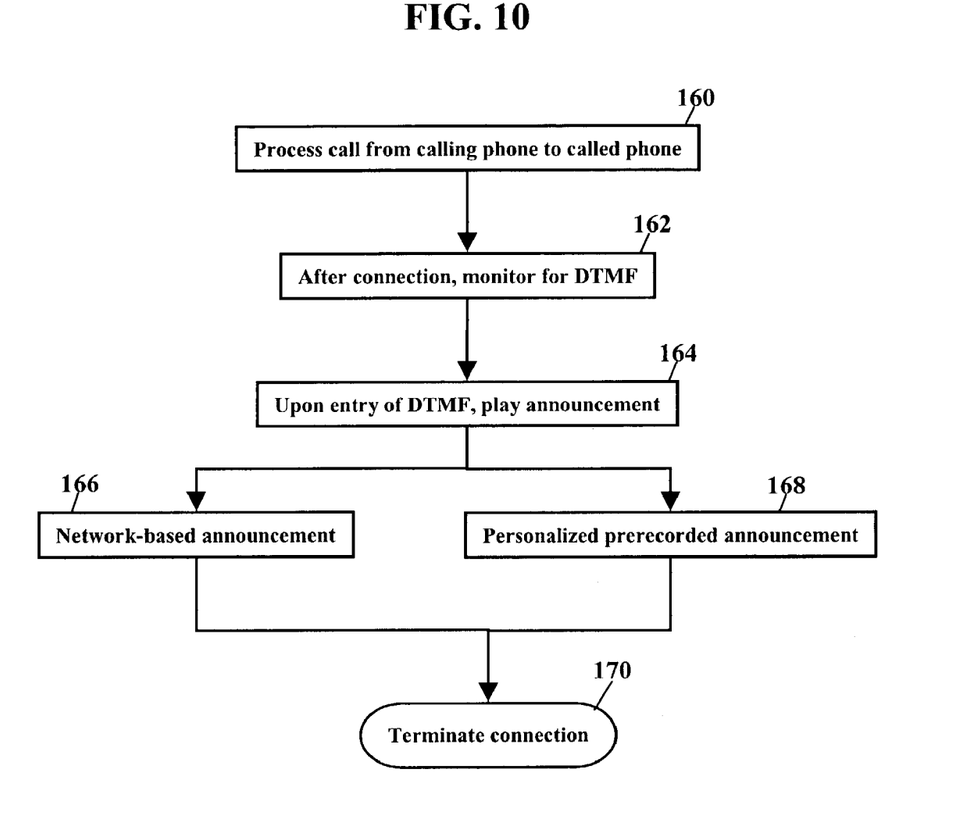
FIG. 10 is a flowchart showing yet another method of providing privacy screening service.

FIG. 10 is a flowchart showing yet another method of providing privacy screening service. A telephone call is processed from a calling telephone number to a called telephone number (Block 160). After a connection between the calling telephone number and the called telephone number, the telephone call is monitored for entry of a Dual-Tone Multi-Frequency (Block 162). Upon entry of the Dual-Tone Multi-Frequency, an announcement is played (Block 164). The announcement may be network-based (Block 166) or a personalized prerecorded announcement of either party to the telephone call (Block 168). The connection is then terminated (Block 170).

The present invention may also be available after termination of the telephone call. After the subscriber hangs up the phone, the subscriber could still have an opportunity to screen the calling telephone. Assume the subscriber accepted the call and, after terminating the call, decides to block receipt of future calls from that same calling telephone number. The call screening request could also be recognized after termination of the call. The Privacy Screening Module (shown as reference numeral 20 in FIGS. 1–6) could query the subscriber's profile information. The subscriber's profile information could contain a "last call received" data field. This "last call received" data field stores the calling telephone number of the last received call. When the subscriber's telephone is offline, and the when the subscriber enters a predetermined call screening request, this call screening request instructs the Privacy Screening Module (or some other application) to add the calling telephone number of the last received call to the customer's profile. The "last call received" data field could even be temporary and change after each incoming call to avoid maintaining a long list of previously received calls. The subscriber could, for example, enter a Dual Tone Multi-Frequency tone to add the last received calling telephone number to the subscriber's profile. The subscriber could then, after termination of the call, add the calling telephone number to the Do Not Call list or blocked call list.

The Privacy Screening Module (shown as reference numeral 20 in FIGS. 1–6) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Privacy Screening Module to be easily disseminated. A computer program product for providing privacy screening during a telephone call comprises the computer-readable medium and the Privacy Screening Module. The Privacy Screening Module is stored on the computer-readable medium.

The Privacy Screening Module may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of providing violations of Do Not Call lists, comprising:
    processing a telephone call, the telephone call from a calling telephone number to a called telephone number;
    after a connection between the calling telephone number and the called telephone number, monitoring the telephone call for a call screening request from a called party;
    upon entry of the call screening request, taking an action in response to the call screening request;
    tagging the telephone call with a date and time and storing the date and time in a database; and
    when the calling telephone number matches an entry in the database, then providing previous dates and times of telephone calls from the calling telephone number to the called party.

2. A method according to claim 1, wherein the step of taking an action comprises playing an announcement.

3. A method according to claim 1, wherein the step of taking an action comprises terminating the connection between the calling telephone number and the called telephone number.

4. A method according to claim 1, wherein the step of taking an action comprises forwarding the live telephone call to voice mail.

5. A method according to claim 1, wherein the step of monitoring the telephone call for the call screening request comprises monitoring for at least one of a Dual-Tone Multi-Frequency and a data message.

6. A method according to claim 1, wherein the step of taking an action comprises communicating the calling telephone number to a Do Not Call list.

7. A method according to claim 1, wherein the step of taking an action comprises updating a subscriber's profile with the calling telephone number.

8. A method according to claim 1, wherein the step of taking an action comprises storing the calling telephone number in a subscriber's blocked call list.

9. A method according to claim 1, wherein the step of monitoring the telephone call for the call screening request comprises monitoring for a softkey entry.

10. A method, comprising:
    receiving a telephone call at a telecommunications switch, the telephone call from a calling telephone number to a called telephone number;
    connecting the telephone call to the called telephone number;
    receiving a call screening request from the called telephone number;
    taking an the telephone call with a date and time and storing the date and time in a database; and
    when the calling telephone number matches an entry in the database, then providing previous dates and times of telephone calls from the calling telephone number to a called party.

11. A method according to claim 10, wherein the step of taking an action comprises playing an announcement.

12. A method according to claim 10, wherein the step of taking an action comprises terminating the connection.

13. A method according to claim 10, wherein the step of taking an action comprises forwarding the live telephone call to voice mail.

14. A method according to claim 10, wherein the step of taking an action comprises storing the calling Telephone number in a database.

15. A method according to claim 10, wherein the step of taking an action comprises communicating the calling telephone number to a Do Not Call list.

16. A method according to claim 10, wherein the step of taking an action comprises updating a subscriber's profile with the calling telephone number.

17. A method according to claim 10, wherein the step of taking an action comprises storing the calling telephone number in a subscriber's blocked call list.

18. A method according to claim 10, wherein the step of receiving the call screening request comprises receiving at least one of a Dual-Tone Multi-Frequency, a softkey entry, and a data message.

19. A method, comprising:
  receiving a telephone call, the telephone call from a calling telephone number to a called telephone number;
  connecting the telephone call to the called telephone number;
  receiving a call screening request from the called telephone number;
  tagging the telephone call with a date and time and storing the date and time in a database;
  in response to the call screening request, forwarding the telephone call to voicemail; and
  when the calling telephone number matches an entry in the database, then providing previous date and times of telephone calls from the calling telephone number to a called party.

20. A method according to claim 19, further comprising terminating the telephone call.

21. A device, comprising:
  a privacy screening module stored a memory device, and processor communicating with the memory device;
  the privacy screening module processing a telephone call from a calling telephone number to a called telephone number, and, after a connection, monitoring the telephone call for a call screening request, and upon entry of the call screening request, taking an action in response to the call screening request the privacy screening module tagging the telephone call with a date and time and storing the date and time in a database, and when the calling telephone number matches an entry in the database, then the privacy screening module provides previous dates and times of telephone calls from the calling telephone number to a called party.

22. A device according to claim 21, wherein the action comprises playing an announcement.

23. A device according to claim 21, wherein the action comprises playing an announcement and, after the announcement is played, terminating the telephone call.

24. A device according to claim 21 wherein the action comprises at least one of i) forwarding the telephone call to voice mail, ii) storing the calling telephone number in a database, iii) and updating a subscriber's profile with the calling telephone number.

25. A device according to claim 21 wherein the privacy screening module forwards the calling telephone number to a Do Not Call list.

26. A device according to claim 21, wherein the action comprises storing the calling telephone number in a subscriber's blocked call list.

27. A device according to claim 21, wherein the device monitors the telephone call for at least one of a Dual-Tone Multi-Frequency, a softkey entry, and a data message.

28. A method according to claim 1, wherein the step of taking an action comprises playing a particular personalized announcement from multiple personalized announcements, the particular personal announcement corresponding to the call screening request.

29. A method according to claim 10, wherein the step of taking an action comprises playing a particular personalized announcement from multiple personalized announcements, the particular personal announcement corresponding to the call screening request.

30. A method according to claim 19, wherein the step of playing the announcement comprises playing a particular personalized announcement from multiple personalized announcements, the particular personal announcement corresponding to the call screening request received from the called telephone number.

* * * * *